United States Patent [19]

Butler et al.

[11] 3,810,126

[45] May 7, 1974

[54] RECIRCULATION MODE ANALOG BUCKET-BRIGADE MEMORY SYSTEM

[75] Inventors: Walter J. Butler; Charles McD Puckette, both of Scotia, N.Y.

[73] Assignee: General Electric Company, Schenectady, N.Y.

[22] Filed: Dec. 29, 1972

[21] Appl. No.: 319,351

[52] U.S. Cl. .......................... 340/173 RC, 307/221 R

[51] Int. Cl. .......................... G11c 27/00, G11c 19/00

[58] Field of Search .......... 340/173 RC; 307/221 R, 307/221 B, 221 C, 221 D; 328/37

[56] References Cited

UNITED STATES PATENTS

| | | | |
|---|---|---|---|
| 3,413,615 | 11/1968 | Botjer | 340/173 RC |
| 3,584,209 | 6/1971 | La-Garde | 340/173 R |
| 3,683,193 | 8/1972 | Weimer | 307/221 R |
| 3,639,842 | 2/1972 | Zarcone | 307/221 R |
| 3,405,397 | 10/1968 | Jury | 340/173 RC |
| 3,675,049 | 7/1972 | Haven | 307/221 R |
| 3,643,106 | 2/1972 | Berwin | 307/221 C |

*Primary Examiner*—Stanley M. Urynowicz, Jr.
*Assistant Examiner*—Stuart N. Hecker
*Attorney, Agent, or Firm*—Louis A. Moucha; Joseph T. Cohen; Jerome C. Squillaro

[57] ABSTRACT

A bucket-brigade delay line (BBDL) is selectively operable in an analog signal read-in mode or memory recirculate mode with signal storage (hold) intervals therebetween. A clock control logic circuit determines the period for each cycle of read-in and "hold" or recirculate and hold. A recirculation control logic circuit determines the number of recirculations between successive read-ins of new information. A mode selector control logic circuit determines the order in which the BBDL operates in the read-in or memory recirculate modes. A feedback network is connected around the BBDL in the recirculate mode. In the recirculate mode a nondestructive read-out capability is obtained and the information can be read out on a display monitor connected to the output of the BBDL.

21 Claims, 15 Drawing Figures

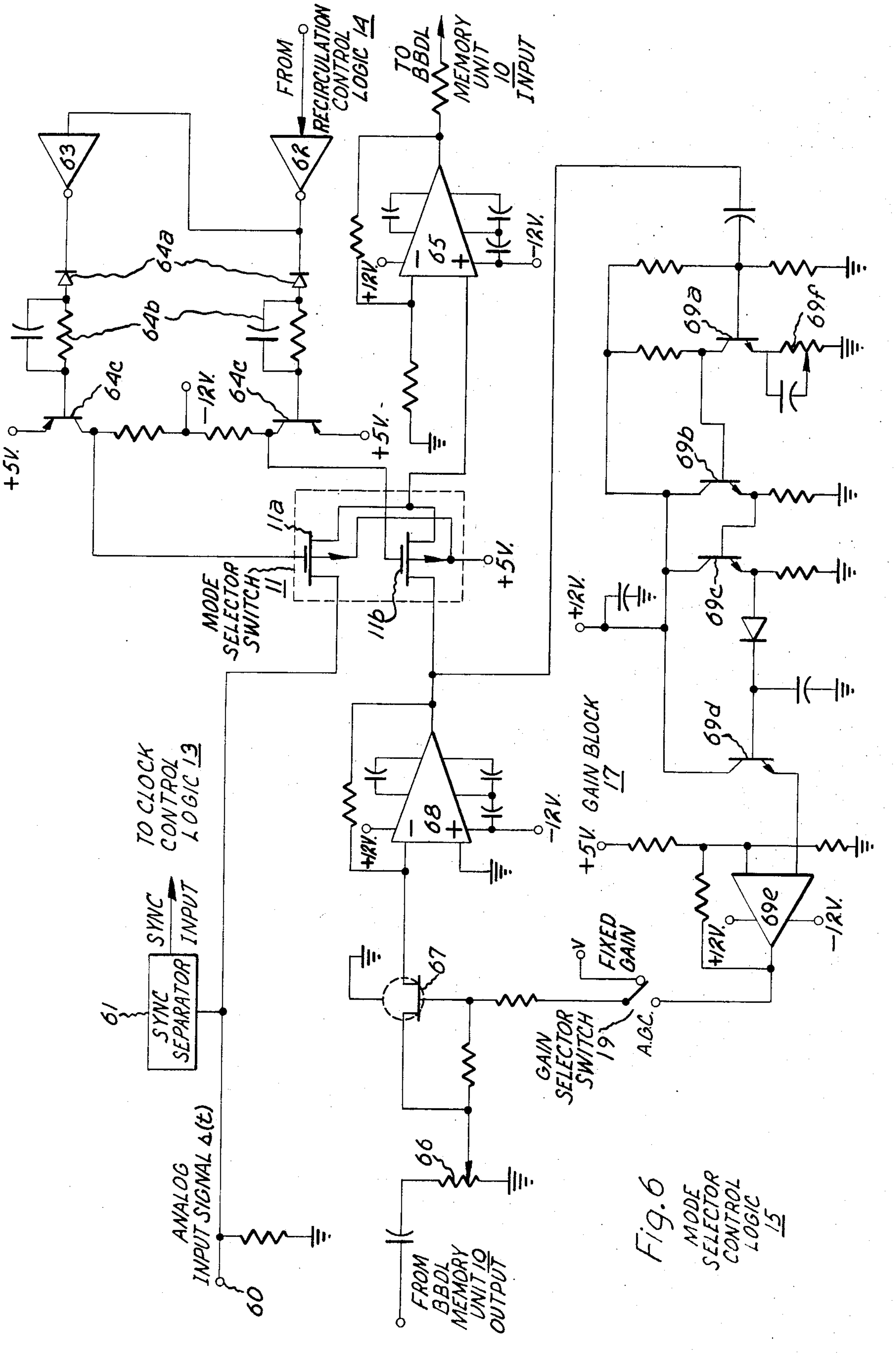
Fig. 6 MODE SELECTOR CONTROL LOGIC 15

RECIRCULATION MODE ANALOG BUCKET-BRIGADE MEMORY SYSTEM

Our invention relates to an analog bucket-brigade memory system having nondestructive read-out capability, and in particular, to a bucket-brigade system selectively operable in a read-in mode in which analog information is entered into the bucket-brigade delay line memory and a recirculate mode in which the stored analog information is recovered, amplified and monitored each time that it is recirculated within the BBDL memory.

In many analog applications of memory systems, it is desirable to have a nondestructive read-out capability. As examples, correlators, bandwidth reduction systems and time-shared communication channels require an analog memory system in which the stored information can be recalled repeatedly in a nondestructive manner. A specific example of the time-shared communication channel is a time-shared video communication channel wherein the video display at each subscriber's monitor must be refreshed at an appropriate rate with information stored at the monitor. This refresh operation occurs while the video channel is being used to transmit information to other subscribers in the network, thereby allowing each subscriber to have a continuous picture on his monitor during the time that he is not actually receiving new information from the video channel. As a specific example of the time-shared video communication channel system, with 90 CRT display units in the network, each of which has a frame rate of 30 frames per second, each subscriber must wait three seconds before receiving a new frame of video information. During that three second interval, some means of refreshing the video information that is displayed on the monitor is required.

The recently developed bucket-brigade circuit is currently finding use in many applications such as audio and video delay, time-error correction, time-scale conversion and filtering as some examples. The bucket-brigade circuit, herein abbreviated to BBDL for bucket-brigade delay line, is variously described as a sampled-data circuit or as a digitally controlled analog charge transfer circuit, but may be most simply described as an analog signal shift register. The bucket-brigade circuit thus provides a means for realizing an electronically variable delay line which has many uses in analog signal processing. The conventional bucket-brigade circuit may be generally described as a series array of capacitors interconnected by suitable electronic switches which, when implemented in monolithic form, may be transistors of any type such as bipolar or the field effect type MOSFET, JFET or MESFET. Information is stored as charge packets in such array of capacitors and is caused to be propagated through the array at a rate determined by the (clock) rate at which the switches are sequentially opened and closed. The bucket-brigade circuit, therefore, provides a noninductive means for implementing an analog delay line, the delay of which is controlled by an external clock, in single monolithic integrated circuit form. Thus, the bucket-brigade circuit should be suitable for use in the above-mentioned analog application of memory systems having nondestructive read-out capability, although such application has not been disclosed in the prior art.

Therefore, one of the principal objects of our invention is to provide an analog memory system having the memory unit thereof fabricated from charge-transfer type devices.

Another object of our invention is to utilize a bucket-brigade delay line in the memory unit.

A further object of our invention is to provide the analog memory system with a recirculating mode of operation.

A still further object of our invention is to provide the system with the capability for repeatedly recirculating the stored information in the BBDL memory in a nondestructive manner whereby the stored information can be repeatedly recalled.

Briefly summarized, our invention is an analog bucket-brigade memory system which may be selectively operable in a memory recirculation mode. The system includes a bucket-brigade delay line which functions as a memory unit for the storage of analog information supplied to the system. Control logic circuitry determines the sequential operation of the system and includes clock control logic, recirculation control logic and mode selector control logic. The clock control logic determines the period for each cycle of read-in and hold (store) or recirculate and hold, as well as the number of clock pulses generated for each read-in or recirculate operation. The recirculation control logic determines the number of recirculatons between successive read-ins of new information. The mode selector control logic determines the order in which the memory unit operates in an information read-in or memory recirculate mode. The analog input signal is read into the BBDL by clocking the BBDL with a predetermined number of clock pulses supplied from a clock generator. After the read-in operation, the clock generator is effectively turned off and the analog information is stored in the BBDL for a "hold" time interval determined by the clock control logic. After the "hold" period, a mode selector switch is actuated to obtain the recirculation mode of system operation wherein the stored information is recirculated one or more times through a feedback network including an automatic gain control or fixed gain block by sequentially turning on the clock generator for the required burst of clock pulses, and then turning the clock generator off for the "hold" time; this sequence being repeated for each recirculation. The recirculation control logic then terminates the recirculation mode by turning off the clock generator and actuating the mode selector switch into its signal input position. The control circuitry then repeats the sequence of operations with respect to a new analog input signal. A display monitor is connected to the output of the BBDL and in the recirculate mode a read-out capability is obtained whereby the stored information can be recalled repeatedly in a nondestructive manner. The bucket-brigate memory unit can be of the single-ended type or two BBDLs may be utilized in push-pull or differential connection.

The features of our invention which we desire to protect herein are pointed out with particularity in the appended claims. The invention itself, however, both as to its organization and method of operation, together with further objects and advantages thereof may best be understood by reference to the following description taken in connection with the accompanying drawings wherein like parts in each of the several figures are identified by the same reference character and wherein:

FIG. 1 is a general block diagram of our recirculation mode analog bucket-brigade memory system;

FIG. 2*a* is a single-ended embodiment of the BBDL memory unit in the system of FIG. 1;

FIG. 2*b* is a push-pull embodiment of the BBDL memory unit;

FIG. 2*c* is a differential embodiment of the memory unit;

FIG. 2*d* is a combined push-pull and differential embodiment of the BBDL memory unit;

FIG. 6 is a schematic diagram of the mode selector control logic in our memory system.

Figure 1:
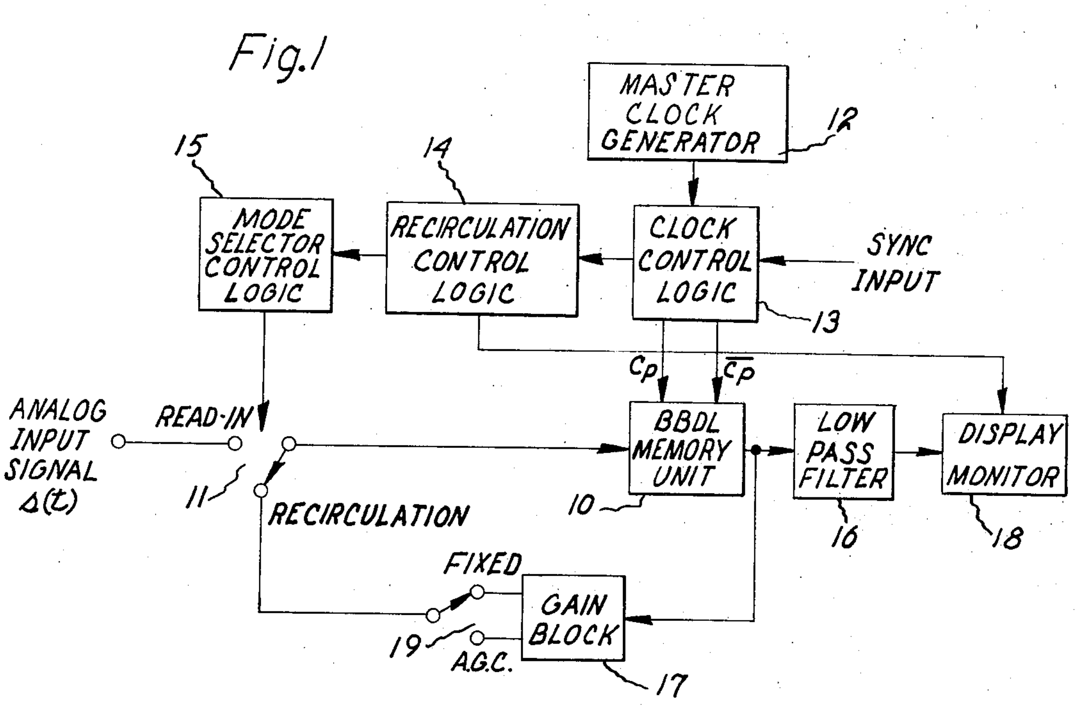

Referring now to FIG. 1, there are shown in block diagram form the basic components of our analog bucket-brigade memory system which is selectively operable in a recirculation mode. The system includes a bucket-brigade delay line (BBDL) memory unit 10 having an input to which is selectively applied an analog input signal representing particular analog information in a first position (or state) of mode selector switch 11 and which provides the memory recirculation mode of operation in a second state thereof. Switch 11 is of the electronic type and may comprise a twin MOSFET analog gate switch as will be described hereinafter with reference to FIG. 6. The analog input signal is generally of an alternating type having both positive and negative polarity components and is assumed to be sinusoidal although it can have other wave shapes and may also include a DC level. The BBDL memory unit 10 includes a bucket-brigade delay line consisting of N delay line stages. The bucket-brigade stages are clocked from a conventional two-phase digital clock pulse generator 12, the output of which is controlled by a clock control logic circuit 13. The analog input signal and a signal for synchronizing the clock control logic therewith may be supplied to our system on a single communication channel by time-multiplexing or may be supplied on separate channels. The clock control logic 13 determines the intervals in which the BBDL is clocked for read-in of the analog information signal, or for recirculation thereof, and also determines the intervals in which such information is stored (held) in the BBDL between the read-in and first recirculate cycle, and between any additional recirculations as will be described in detail with respect to FIG. 4 which shows the details of the clock control logic. A continuous square wave signal derived from the master clock generator 12 in the clock control logic has a repetition rate which determines the total period for each read-in and hold interval or recirculate and hold interval. This continuous square wave signal is supplied to a recirculation control logic circuit 14 that determines the number of recirculations to be performed for each input analog information signal and will be described in detail with reference to the FIG. 5 recirculation control logic diagram. The output of the recirculation control logic 14 is supplied to the mode selector control logic circuit 15 which controls the state of mode selector switch 11 as will be described hereinafter with reference to FIG. 6. The output of the BBDL memory unit 10 is connected to an input thereof in the recirculation mode state of switch 11 by means of a feedback path including a gain block component 17 which may be of the automatic gain control (A.G.C.) or fixed gain type as determined by switch 19. The output of the BBDL memory unit 10 is also connected to the input of a low pass filter network 16 which recovers the baseband signal. The filter 16 in ideal form could be the output element of the BBDL memory unit 10, but in practice the non-ideal characteristics thereof dictate that it be connected outside the feedback loop in order to prevent an undesired slight phase shift in the recirculating signal. Filter network 16 is a conventional low pass type filter which, as one example, can include one or more L-sections of a series inductor and shunt capacitor. The output of filter 16 is connected to the input of a display monitor 18 which may be a conventional cathode ray tube or a television receiver in a time-shared video communication channel application of our invention. The operation of the display monitor is synchronized wiht the memory system operation by means of the signal generated in the recirculation control logic 14.

Our analog bucket-brigade memory system operates in the following manner. Mode selector switch 11 is initially in its input signal read-in state whereby analog input information signal is supplied to the input of the BBDL memory unit 10. At the same time, the control logic synchronizing signal supplied to clock control logic circuit 13 causes the logic therein to begin generating the continuous square wave signal which determines the read-in, recirculate and hold periods. The read-in interval includes the generation of a first burst of the two-phase clock pulses $C_P$ and $\overline{C}_P$ of sufficient number to cause the analog input information signal to be read into the BBDL memory unit 10. At the end of the first burst of clocking pulses the sampled analog signal is held (stored) in the BBDL for the "hold" interval established by the clock control logic. The "hold" interval may be as long as several hundred milliseconds. The maximum length of time that the analog information may be stored within the memory unit 10 is limited primarily by the reverse leakage current across the p-n junctions of the BBDL circuit. At the end of the "hold" interval, the recirculation control logic 14 causes the state of the mode selector switch 11 to switch to the recirculate mode whereby the feedback circuit including gain block 17 is connected from the output of BBDL memory unit 10 to the input thereof. The start of the recirculation cycle results in the generation of a second burst of clock cycles of number equal to that in the first burst. The second burst of clock pulses causes the sampled analog information to be read out of memory unit 10 and recirculated through the feedback loop and reentered into the memory unit 10. At the end of the recirculation, the information signal is again stored in the memory unit for the "hold" interval. During the recirculation interval, the analog information is displayed on the monitor unit 18 as it is being read out of the memory unit. The recirculation cycle (recirculate plus hold intervals) may be repeated by a plurality of times as determined by the recirculation control logic. Thus, our memory system is especially suitable for applications where a given analog input information signal must be capable of being recalled repeatedly at will. After completion of the recirculation cycle or cycles, the state of the mode selector switch 11 is switched to the read-in mode and the read-in and recirculate cycles are repeated for the next analog input information signal.

Figure 2A:
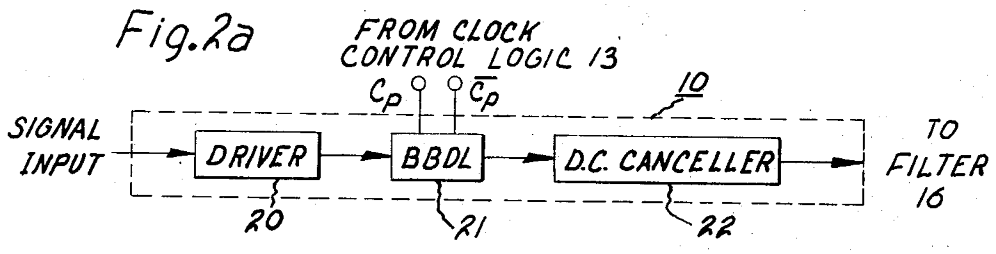

Referring now to FIG. 2*a*, there are shown the components in block diagram form of the BBDL memory unit 10 for a single-ended embodiment of the BBDL. The memory unit includes a driver stage 20 for providing suitable interfacing (correct bias and buffering) between the analog input signal source and the BBDL 21 connected to the output of driver stage 20. BBDL 21 and all of the other BBDLs to be described hereinafter may be of the serial type or serial/parallel type.

The output of BBDL 21, as well as the output of canceller circuit 22, is a delayed sampled-data signal waveform that switches at the clock frequency between the sample value of the analog input signal and a reference voltage level. The reference voltage level is equal to the gate voltage (i.e., clock signal voltage amplitude) minus the threshold voltage of the active (transistor) devices in MOSFET BBDLs and is equal to the pinch-off voltage in JFET or MESFET BBDLs. The analog input signal is sampled at a sufficiently rapid (clock) rate such that envelope of the sampled-data signal at the BBDL output faithfully follows the input signal waveform except for undesired DC components resulting from the input bias voltage and sample and delay processing of the signal within the BBDL. The signal at the output of the single-ended BBDL also includes the clock frequency and harmonics thereof which together with the undesired DC components can cause improper operation of circuits connected to the output of our memory system.

In the prior art, capacitor decoupling has been utilized at the output of the BBDL for removing the DC component and has been satisfactory in continuous mode operation of the BBDL wherein the clock pulses are continuously applied to the BBDL. However, in our memory system the DDBL is operated in what is described herein as a gated clock-mode wherein information is read into the BBDL and stored therein for a particular "hold" time interval by effectively turning off the clock generator for such interval, and then the clock is again turned on for the recirculation cycle. In such gated clock mode of operation, the prior art capacitor decoupling is relatively ineffective because the decoupling capacitor is sensitive only to the average DC value of the output waveform of the BBDL; and therefore cannot restore the average value of the analog component to zero DC level for all duty cycles. Also, leakage currents which vary with temperature cause undesired DC level shifts at the output of the BBDL when connected in single-ended configuration as illustrated in FIG. 2*a*. The DC canceller circuit 22 connected to the output of BBDL 21 provides a means whereby the signal output from the BBDL is re-biased to its original value at the signal input, that is, circuit 22 adds the correct amount of DC bias to the BBDL output signal so that for a given duty cycle, the average value of the analog component is restored to its original level at the BBDL input. The DC canceller circuit 22 may typically be a pulse generator for generating a pulse of the same duty cycle as the output of the BBDL (i.e., pulse duration equal to the duration of the clock burst waveform), the polarity of the pulse being opposite to that of the DC content of the BBDL output, and the amplitude being such that when it is added in a summer to the BBDL output signal, the average DC of the analog component of the resulting waveform is the same as that at the BBDL input.

Although the half clock period spacing between the voltage pulses in the BBDL output waveform may be tolerated in some cases, cancellation of the undesired spectral energy contained in such sampled data form of the output signal is often desirable since it permits relaxation of the post-brigade filter network 16. Also, amplifiers which are generally utilized in post-brigade circuits, such as the gain block 17 in the feedback loop, are slew-rate limited, and the switched output signal at half clock periods can cause amplifier instability or distortion.

Figure 2B:
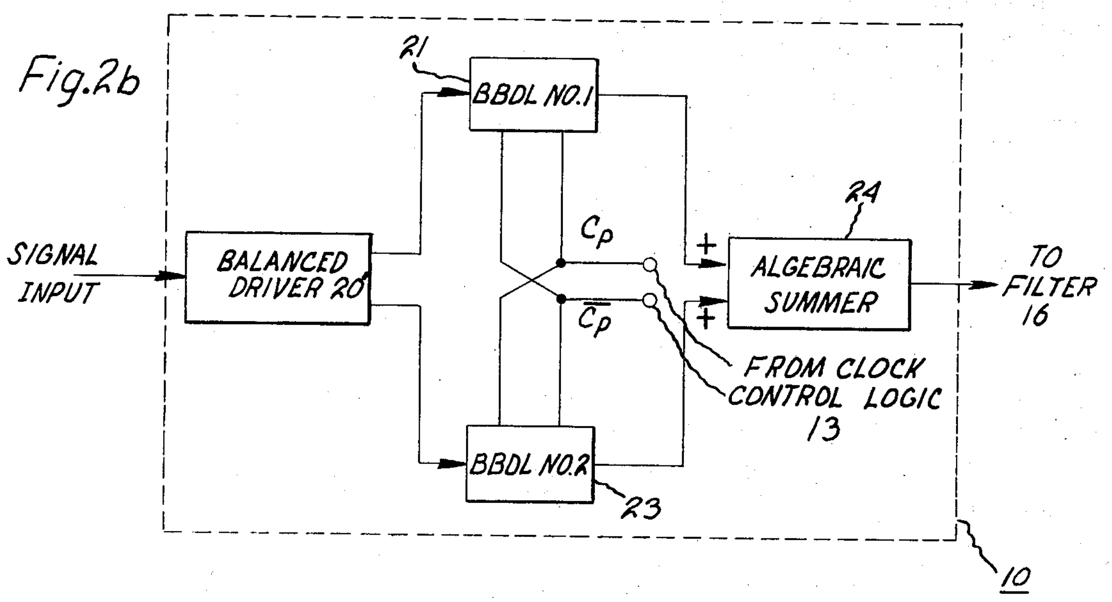
Figure 2C:
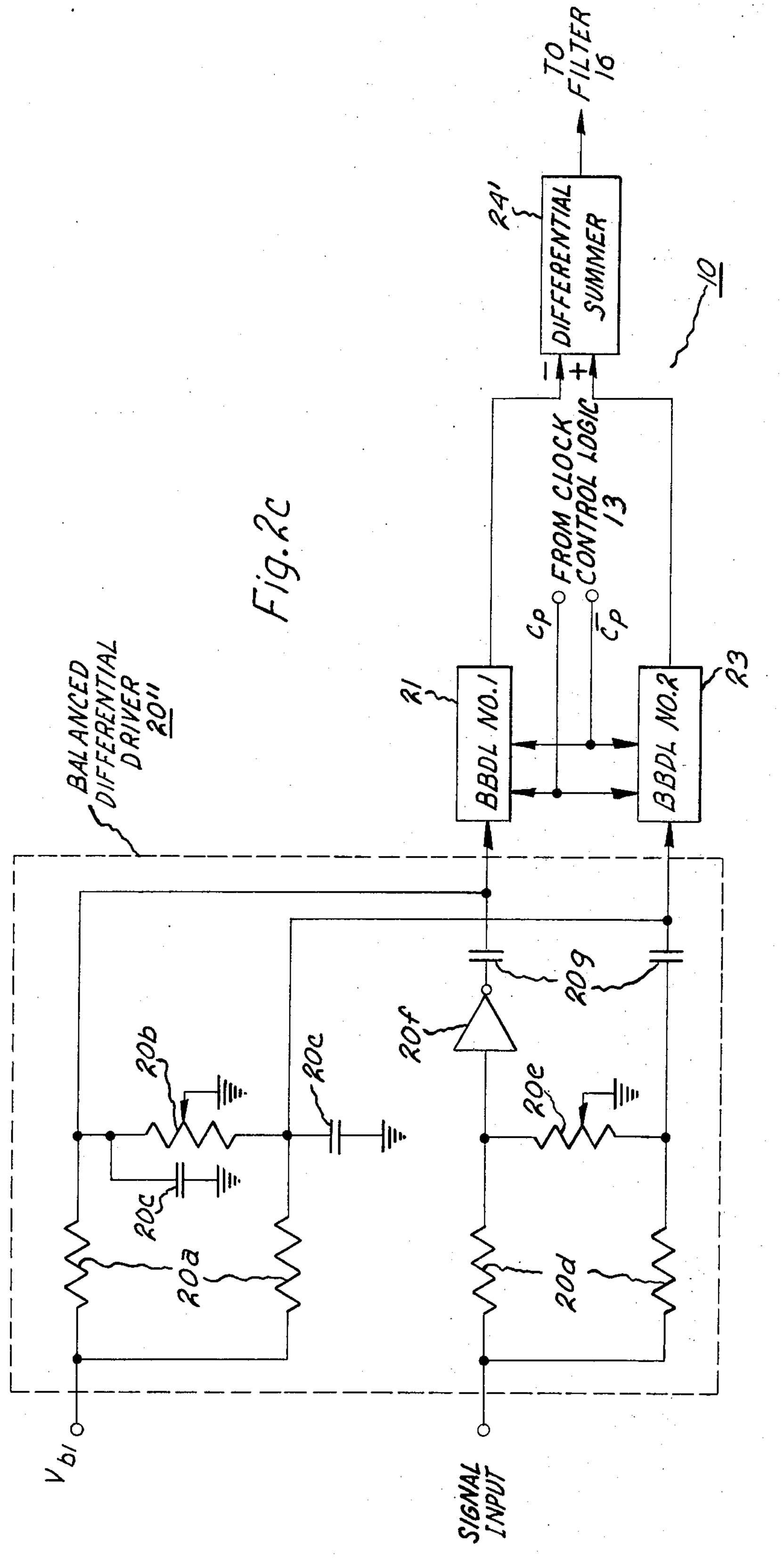
Figure 2D:
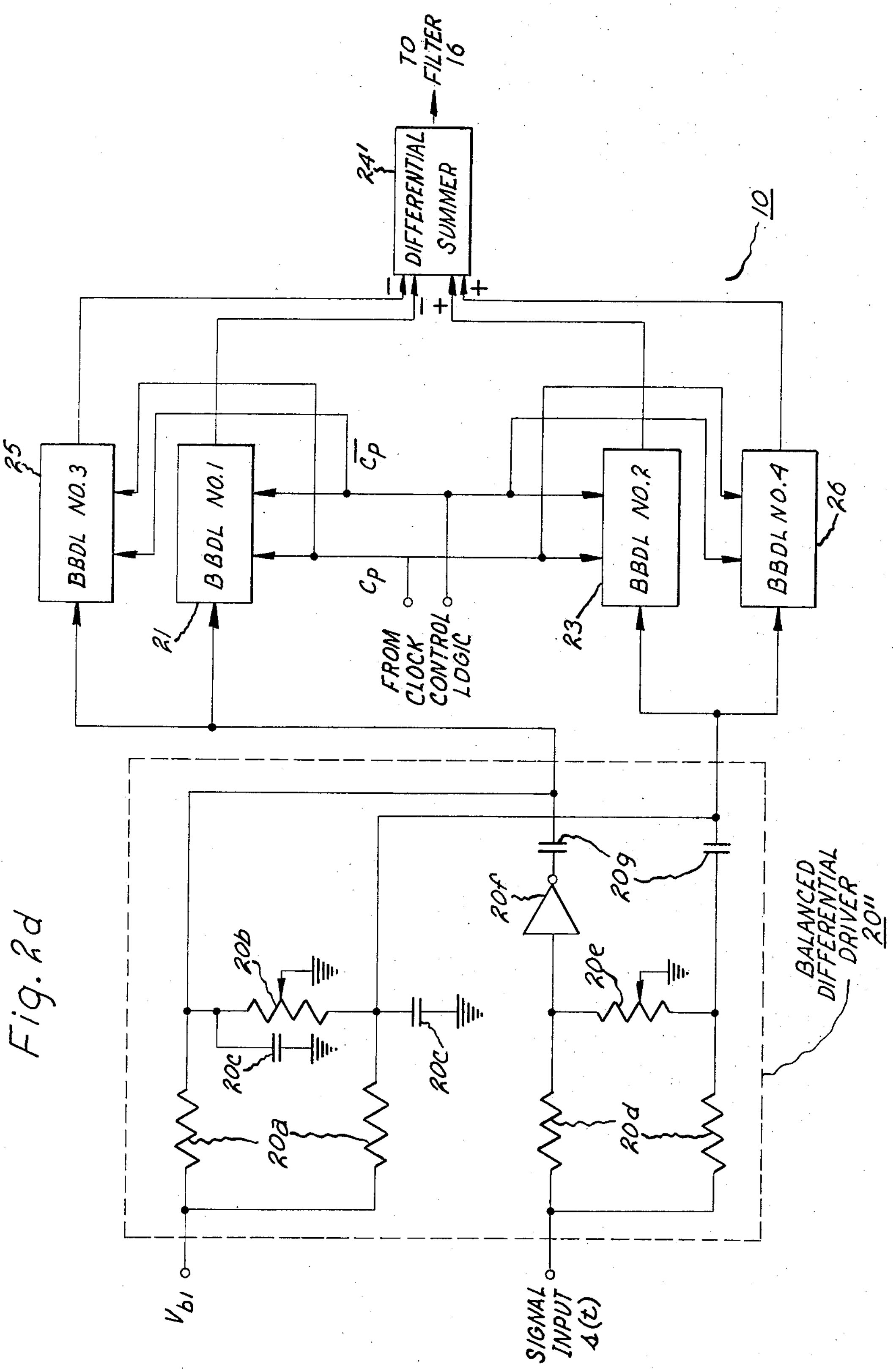

A first means for obtaining at least some cancellation of this unwanted (high frequency) spectral energy in the BBDL output signal is illustrated in FIG. 2*b* wherein a second BBDL 23 is connected in push-pull relationship with respect to the first BBDL 21. BBDL 23 has the same number of bucket-brigade stages as BBDL 21 to thereby provide the same time delay as BBDL 21 and is connected in parallel therewith. However, the bucket-brigade stages in BBDLs 21 and 23 are clocked in parallel with the corresponding stages in BBDL 21 but 180° out-of-phase as indicated by the reversed $C_p$ and $\overline{C}_p$ clock line inputs to BBDLs 21 and 23. The effect of the push-pull connection of BBDLs 21 and 23 is to sum the reference level and sample value of the delayed signal for each half clock period and thus the output of conventional algebraic summer 24 is a smoothed waveform consisting of voltage pulse components each having a duration of half a clock period and therefore not spaced apart by the half clock periods as in the case of the waveform generated in the FIG. 2*a* embodiment. The driver circuit in FIG. 2*b* is of conventional design for summing the input analog signal with a DC bias voltage such that the two outputs of driver 20′ consist of the sum of the bias voltage and analog input signal which are applied to the inputs of BBDLs 23 and 21, respectively. Thus, driver circuit 20′ may consist of a pair of coupling capacitors for passing the generally alternating voltage type analog input signal to the two BBDL inputs, and a DC voltage bias network which establishes a suitable DC bias voltage for centering the analog input signal on the dynamic range window of each BBDL. That is, the bias voltage assures that the analog input signal will be of only one polarity in its propagation through the BBDLs so that the p-n (e.e., diode) junctions of the BBDL are not forward biased. The aforementioned driver circuit is satisfactory when BBDLs 21 and 23 have identical characteristics. However, in the more practical case the two BBDLs do not have identical characteristics and the driver circuit 20′ that is utilized is a balanced driver in that it has a bias balance control and a gain balance control (both of which may be conventional networks as illustrated in FIGS. 2*c* and 2*d*) for insuring that the two BBDL outputs are identical with respect to gain and DC level. Thus the balanced driver circuit 20′ compensates for any difference in characteristics between the two BBDLs such as in gain and DC level.

The push-pull embodiment of the BBDL memory unit 10 illustrated in FIGS. 2*b* unfortunately has no effect on the undesired DC components in the BBDL output signal which result from gated-clock operation of the BBDL in which the BBDL is gated "off" for the "hold" period.

Referring now to FIG. 2*c*, there is shown a third embodiment of our BBDL memory unit 10 which has a differential mode of operation that results in cancellation of all of the undesired DC as well as the clock frequency components normally introduced in the operation of BBDL circuits. The circuit in FIG. 2*c* also includes two bucket-brigade delay lines having the same number of bucket-brigade stages which are clocked in parallel as in the FIG. 2*b* embodiment. However, the bucket-brigade stages in FIG. 2*c* are clocked in-phase as distinguished from the out-of-phase clocking in FIG. 2*b*.

The details of the balanced differential driver circuit 20'' are illustrated within the dashed outline in FIG. 2*c*. As noted above, the balanced differential driver circuit preferably includes both bias balance control and gain balance control. A conventional bias balance control circuit may consist of two fixed resistors 20*a* of equal resistance and having input ends connected to the source of bias voltage $V_{b1}$ and having output ends connected to the inputs of the BBDLs 21 and 23. The output ends of resistors 20*a* are interconnected by means of a potentiometer 20*b* having a grounded variable center tap. A pair of capacitors 20*c* are connected from the output ends of fixed resistors 20*a* to ground for providing zero AC impedance with respect to ground.

A typical gain balance control in the balanced differential driver circuit 20'' may consist of a pair of fixed resistors 20*d* of equal resistance and having input ends connected to the mode selector switch 11 and output ends interconnected by means of potentiometer 20*e* which also has its variable center-tap grounded. The output end of a first of the fixed resistors 20*d* is connected through a conventional inverter 20*f* and capacitor 20*g* to the input of the first BBDL 21. The output end of the second fixed resistor 20*d* is connected through a second capacitor 20*g* to the input of the second BBDL 23. The outputs of the bias balance control and gain balance control networks are connected to the source electrodes of transistors in the input sampling stages of the two BBDLs as will be described with reference to FIG. 3. Adjustment of potentiometer 20*b* in the bias balance control network insures that the two BBDL outputs are identical with respect to DC level. Adjustment of potentiometer 20*e* in the gain balance control network assures that the two BBDL outputs are identical with respect to gain and thus the balanced differential driver circuit compensates for any difference in characteristics between the two BBDLs. As should be evident with respect to the differential connection of the two BBDLs embodiment in FIG. 2*c*, the output of the second BBDL 23 is the inverse of the output of the first BBDL 21 with respect to the sampled analog signal but not with respect to the DC and clock frequency components. The outputs of the two BBDLs 21 and 23 in the differential embodiment of FIG. 2*c* are differentially summed in differential summer 24' and the resultant output thereof is again a sampled and delayed version $s(t\text{-T})$ of the analog input signal $s(t)$ but now without any undesired DC components which have been canceled in the differential summing operation. This differential mode of operation eliminates all undesired DC components which would otherwise exist in the BBDL output signals as well as the clock frequency and harmonics thereof. Undesired DC level shifts at the outputs of the BBDLs due to leakage currents varying with temperature will also be canceled by the differential mode of operation. However, the sampled and delayed waveform $s(t\text{-T})$ at the output of differential summer 24' in the differential mode embodiment will have the half clock period spacings present in the single-ended embodiment of FIG. 2*a* in the absence of any additional waveform smoothing circuitry.

Referring now to FIG. 2*d* there is shown a fourth embodiment of our BBDL memory unit 10 which is provided with a first means for obtaining more complete cancellation of unwanted spectral energy in the BBDL output signals due to the half clock period spacings in the BBDL output waveform. Cancellation of the unwanted high frequency components which comprise the unwanted spectral energy is obtained by the use of the two additional BBDLs connected in push-pull relationship about the original BBDLs 21 and 23 connected in the differential mode of FIG. 2*c*. Thus, a third BBDL 25 also of N stages is connected in parallel with BBDL 21, and a fourth BBDL 26 also of N stages is connected in parallel with BBDL 23. The bucket-brigade stages in BBDLs 25 and 26 are clocked in parallel with the corresponding stages in BBDLs 21 and 23, respectively, but 180° out-of-phase as indicated by the reversed $C_p$ and $C_p$ clock line inputs to BBDLs 25 and 26 relative to BBDLs 21 and 23. The effect of the push-pull connection of each pair of BBDLs (as in the case of the FIG. 2*b* embodiment) is to sum the reference level and sample value of the delayed input signal $s(t\text{-T})$ for each half cycle period and thus the output of the push-pull BBDLs 21 and 25 is a smoothed waveform having voltage pulses each having a duration of a whole clock period rather than the switched output signal at half clock periods in the FIGS. 2*a* and 2*c* embodiments.

The FIG. 2*c* and 2*d* embodiments of the BBDL memory unit 10 also provide cancellation of the pedestal effect residual DC level which occurs during the gated mode of operation that is characteristic of our system wherein there are alternate on and off periods of the output signal due to the information storage interval between read-in and recirculation as well as between each circulation in case of multiple recirculations. The alternate on and off periods of the output signal results in an average DC level existing in the output signal, and this average DC level will vary directly with the on/off duty cycle of the BBDL. Operation of our system with the differential bucket-brigade circuits illustrated in FIGS. 2*c* and 2*d* results in complete cancellation of this pedestal effect residual DC level since all of the undesired DC components are canceled in the differential summation and thus even a gated mode of operation provides a faithful reproduction of the analog input signal.

Figure 3:
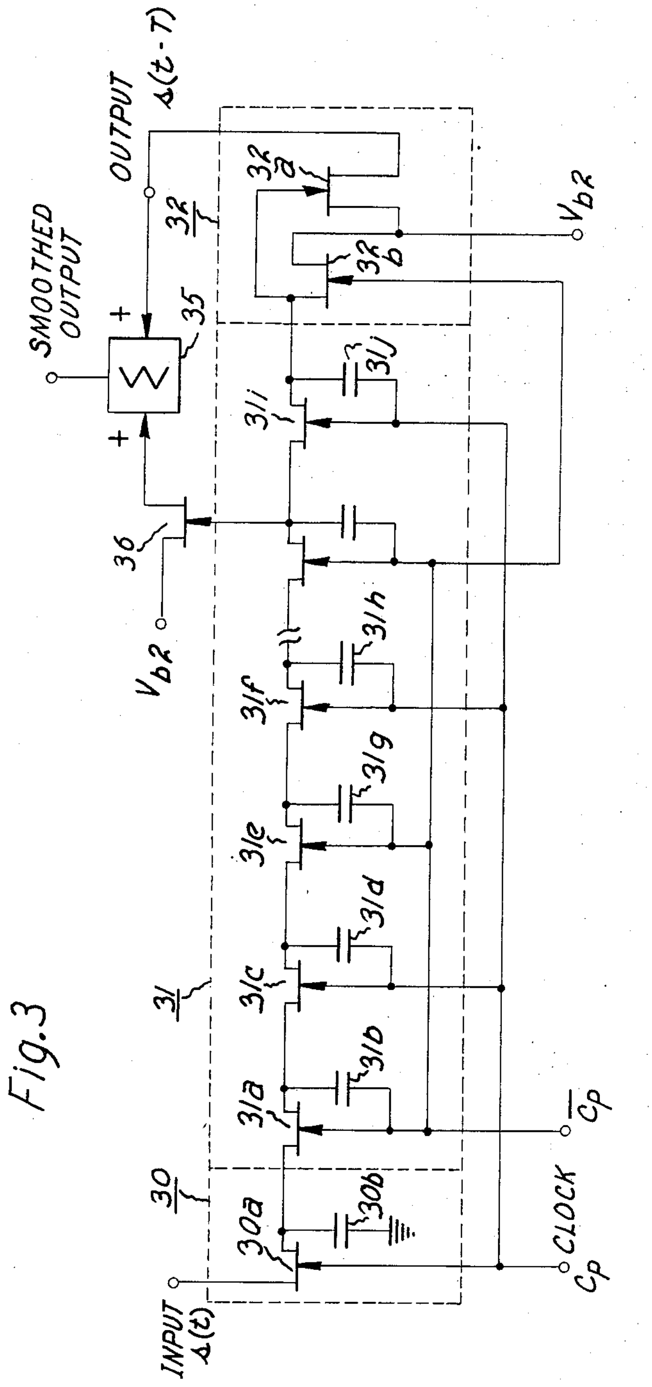
FIG. 3 is a schematic diagram of a typical BBDL in the BBDL memory unit.

Referring now to FIG. 3, there is illustrated within the dashed outline, one of the BBDLs which consists of an input sampling stage 30, a plurality of delay line stages 31, and an output stage 32. The BBDL thus samples, holds and delays the analog input signal $s(t)$ by a time T which is normally an integral number of (sampling) intervals $T_s$ at which the input signal is sampled. The input sampling stage 30 of the BBDL consists of a first electronic switch 30*a*, which is illustrated in FIG. 3 as a field effect transistor of type JFET or MESFET but which may also be a MOSFET device or the bipolar type transistor.

Depending upon the type of channel type semiconductor material utilized in the monolithic fabrication of the BBDL, the analog input signal $s(t)$ to the BBDL may be biased with a positive or negative voltage. Thus, in the case of p-channel type transistor devices, the analog input signal is biased from a source $V_{b1}$ of negative voltage for insuring that the signal applied to the source electrode of input sampling transistor 30*a* is always a negative polarity and thereby prevents forward biasing of p-n junctions within the BBDL. In the case of n-channel type transistor devices, the input bias is of positive polarity.

Transistor 30*a* has its gate electrode connected to the common clock line supplied with the square wave clock pulses $C_p$. The drain electrode of transistor 30*a* is connected to a grounded capacitor 30*b* and to the source electrode of a like transistor 31*a* in the first stage of the delay line stages 31. The input signal sampling interval $T_s$ is thus controlled by the frequency of clock pulses $C_p$.

The plurality of delay line stages 31 are formed by serially connected pairs of bucket-brigade stages. Each pair of bucket-brigade stages includes two serially connected electronic switches (illustrated as n-channel JFETs or MESFETs in FIG. 3) and a charge packet storage capacitor connected across the drain and gate electrodes of each transistor. The transistors in the BBDLs, as well as the storage capacitors, are all identical. The gate electrode of the first transistor in each delay line stage is also connected to the complementary clock pulse line $\overline{C}_p$ whereas the gate electrode of the second transistor is also connected to clock pulse line $C_p$. Thus, capacitor 31*b* is connected across the drain and gate electrodes of transistor 31*a*, and the gate electrode of transistor 31*a* is also connected to the $\overline{C}_p$ clock pulse line. The drain electrode of transistor 31*a* is connected to the source electrode of transistor 31*c* which together with capacitor 31*d* forms the second half of the first pair of bucket-brigade stages. Capacitor 31*d* is connected across the drain and gate electrodes of transistor 31*c*, and the gate electrode is also connected to the common clock line $C_p$. The drain electrode of transistor switch 31*c* is connected to the source electrode of transistor 31*e* in the following pair of bucket-brigade stages consisting of transistors 31*e*, 31*f* and capacitors 31*g*, 31*h*. The second and all further pairs of bucket-brigade stages are serially connected in the same manner as the first stage. The number of pairs of bucket-brigade stages determines the BBDL time delay, T, for a given clock frequency.

The clock voltage pulses which sample the input signal $s(t)$ at the clock frequency are of negative polarity for n-channel JFET (or MESFET) bucket-brigades. In the case of the bucket-brigades being fabricated with p-channel MOSFET devices, the clock pulses are also of negative polarity but 180° phase-displaced from the corresponding pulses associated with the n-channel JFET (or MESFET) bucket-brigades. The output of the n-channel JFET (or MESFET) or n-channel MOSFET BBDL is a positive polarity sampled and delayed voltage waveforms $s(t\text{-}T)$. The corresponding output voltage waveforms for a MOSFET or p-channel JFET or MESFET fabricated BBDL would be of negative polarity. The clock pulses are of positive polarity for n-channel MOSFET or p-channel JFET or MESFET brigades. For bipolar brigades fabricated with npn devices, positive polarity clock pulses are required, and for pnp devices, negative polarity clock pulses are required.

The last bucket-brigade stage of the BBDL consists of transistor 31*i* and capacitor 31*j* connected across its drain and gate electrodes. The gate electrode of transistor 31*i* is also connected to the common $C_p$ clock pulse line, the source electrode is connected to the drain electrode of the previous bucket-brigade stage, and the drain electrode could comprise the output of the BBDL. However, for purposes of isolating the output of the BBDL an output stage 32 is connected to the drain electrode of transistor 31*i*. The output stage 32 comprises a source-follower stage consisting of a transistor 32*a* having its gate electrode connected to the drain electrode of transistor 31*i*, its drain electrode connected to a source of direct current bias voltage $V_{b2}$ (of positive polarity when input bias $V_{b1}$ is positive and of negative polarity when $V_{b1}$ is negative) and its source electrode being the output terminal of the BBDL. A transistor 32*b* having its source electrode connected to the drain electrode of transistor 31*i*, its drain electrode connected to the source of bias voltage $V_{b2}$ and its gate electrode connected to the common complementary clock pulse line $\overline{C}_p$ is utilized as a switching device for precharging the last capacitor 31*j* in the BBDL to a full charge. That is, transistor 32*b* permits filling the last "bucket" in accordance with conventional operation of BBDLs wherein the fullness of the buckets (the capacitive storage elements) proceeds from the last stage toward the first stage and the emptiness of such buckets, which contains the information (sampled analog input signal) to be propagated through the BBDL, proceeds from the first to the last stage. Thus, transistor 32*b* functions as a switch for providing (in conjunction with bias voltage $V_{b2}$) full charge of capacitor 31*j* prior to receiving an analog signal sample. The signal information is represented by the extent to which a full bucket is emptied, that is, the signal propagation through the BBDL from the input to the output ends is affected by means of a charge deficit transfer.

The push-pull arrangement of the four BBDLs in the FIG. 2*d* embodiment illustrated a first means for obtaining more complete cancellation of unwanted high frequency components in the BBDL output signal $s(t\text{-}T)$. A second means for obtaining this cancellation is illustrated in FIG. 3 wherein the BBDL output at the source electrode of transistor 32*a* is connected to a first input of a conventional algebraic summer 35, and the input to the source electrode of transistor 31*i* is also connected to the gate electrode of a transistor 36. The drain electrode of transistor 36 is connected to the same source of voltage $V_{b2}$ as in the output circuit 32, and the source electrode is connected to the second input of summer 35. The smoothed output of summer 35 has cancellation of much of the undesired high frequency spectral energy.

Figure 4:
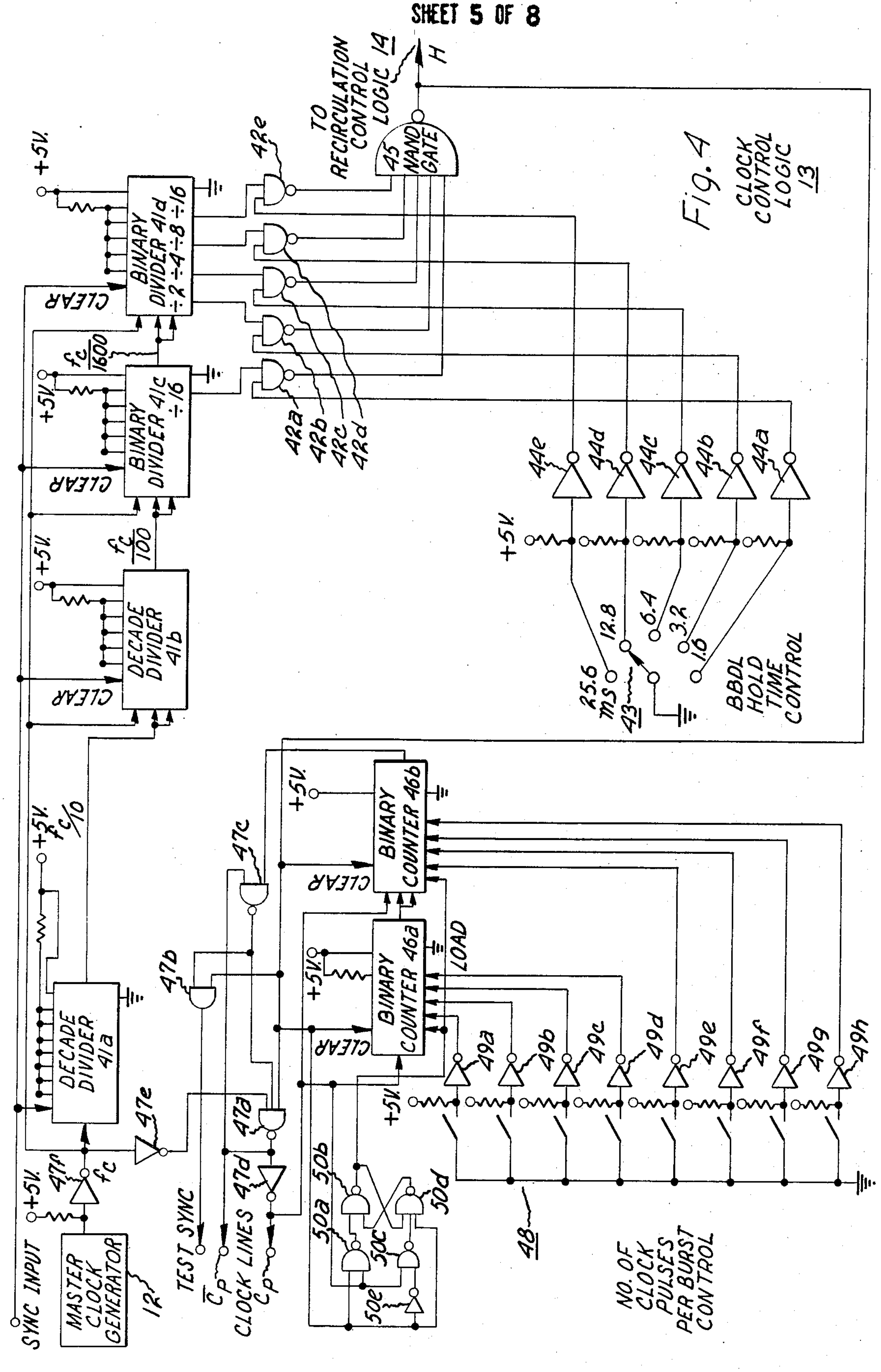
FIG. 4 is a schematic diagram of the clock control logic in our memory system.
Figure 5:
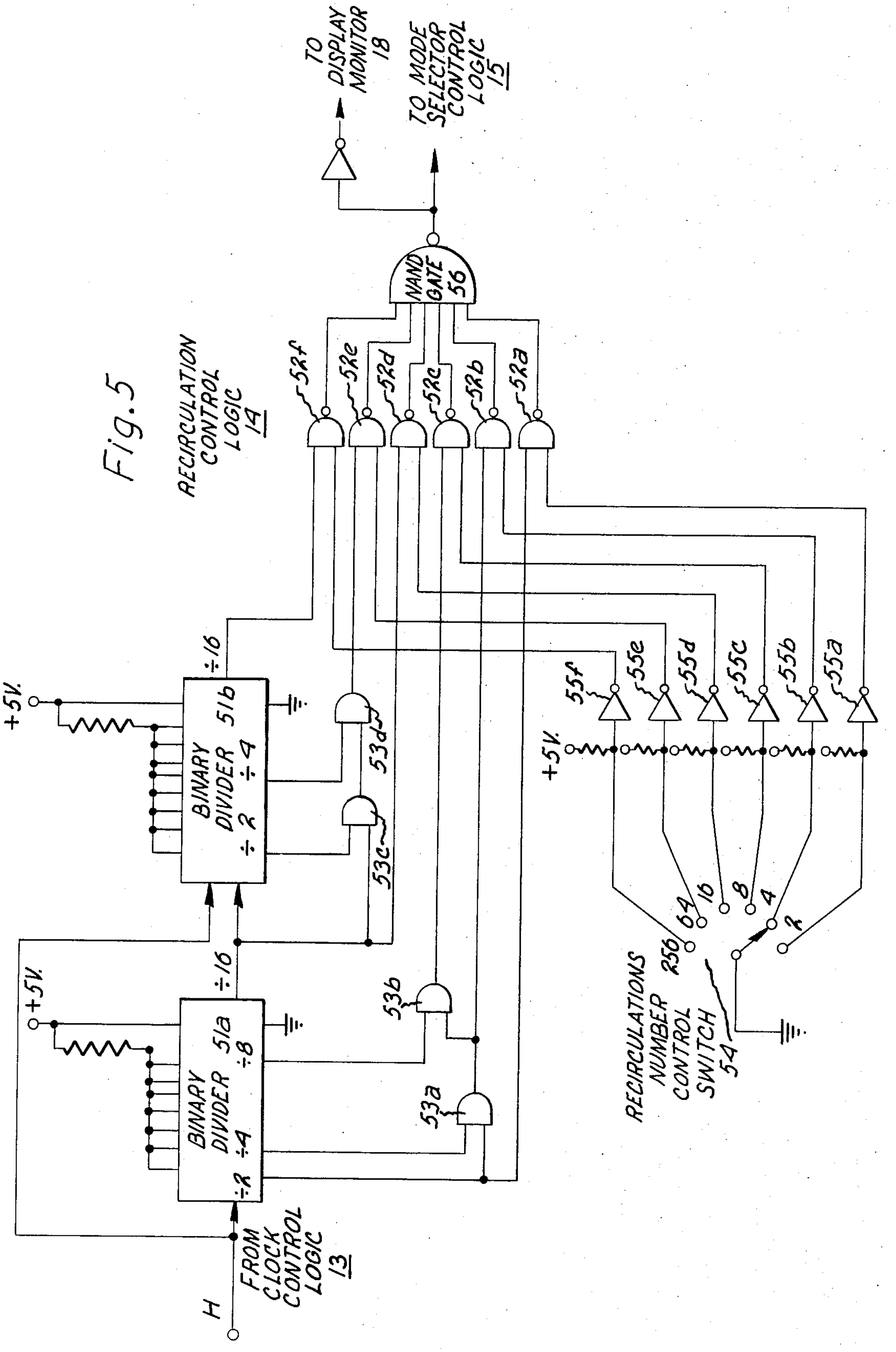
FIG. 5 is a schematic diagram of the recirculation control logic in our memory system.

The mode selector control logic 15 for determining the selected mode of operation of our memory system, as well as the clock control logic 13 and recirculation control logic 14 which are necessary for the operation of our system, may be achieved by any number of logic circuits. For purposes of illustrating a specific embodiment of the control logic circuits that may be utilized in our system, FIG. 4 illustrates the clock control logic, FIG. 5 illustrates the recirculation control logic and FIG. 6 illustrates the mode selector control logic.

The logic circuitry at the receiving end of our recirculation mode analog bucket-brigade memory system is determined by the input control signal which is time-multiplexed or in other manner synchronized with the input analog signal. The input control signal could include all of the logic information necessary for directly operating the mode selector switch 11 in the receiving end of the system, and in such case there would be no need for any additional logic circuitry in the receving end. However, in the more practical case only a synchronizing (SYNC INPUT) signal in time-multiplexed with the analog input signal for synchronizing the bursts of clock pulses with the analog input signal. In such case, FIG. 4 illustrates the clock control logic circuit 13 which generates a continuous square waveform voltage signal H that has a programmable repetition rate. This repetition rate determines the period of the read-in and recirculation(s) cycles, and is also the input signal to the recirculation control logic in FIG. 5. Waveform H is illustrated in FIG. 7(*a*). The clock control logic also generates a programmable number of clock pulses in response to each square wave H (i.e., a programmable number of clock pulses per burst thereof) as illustrated in FIG. 7(*f*) for either reading-in new information into the BBDL memory unit 10 or for recirculating the stored information. The burst of clock pulses are each generated at the positive-going edge of the H square wave as shown in FIG. 7(*f*), or may be generated at the negative-going edge by other conventional logic means.

The clock control logic circuit includes a master clock generator 12 for generating a continuous wave of square wave voltage pulses at the clock frequency (or more correctly the repetition rate) $f_c$ which as one typical example may be one megahertz (mHz). The master clock frequency is supplied to the "clock" inputs of two decade dividers 41*a* and 41*b* and two binary dividers 41*c* and 41*d* connected in series circuit relationship (i.e., the divide-by-10 "carry" output of divider 41*a* is connected to the enable inputs of divider 41*b*, etc.) The "carry" outputs of the first 41*a* and second 41*b* decade dividers and binary divider 41*c* are thus voltages of continuous pulsed waveform of repetition rate $f_c/10$, $f_c/100$ and square waveform of frequency $f_c/1600$, respectively. The continuous waveform "carry" pulses at the "carry" outputs of decade dividers 41*a* and 41*b* are of pulse width equal to the period of the square wave clock pulses at the output of master clock generator 12. The second binary divider 41*d* has four outputs wherein the first output is a divide-by-2, the second a divide-by-4, the third a divide-by-8 and the fourth a divide-by-16. Thus, the frequency outputs available at the four outputs of binary divider 41*d* are $f_c/3200$, $f_c/6400$, $f_c/12,800$ and $f_c/25,600$. A more practical manner in depicting the outputs of binary dividers 41*c* and 41*d* is in terms of the period of each output square wave. Thus, the frequency output $f_c/1600$ is equal to a square wave having a period of 1.6 milliseconds, the divide-by-2 output of binary divider 41*d* has a period of 3.2 milliseconds, the divide-by-4 output a period of 6.4 milliseconds, the divide-by-8 output a period of 12.8 milliseconds and the divide-by-16 output a period of 25.6 milliseconds. the SYNC INPUT signal for synchronizing the bursts of clock pulses with the analog input signal $s(t)$ is applied to the "clear" input of dividers 41*a–d*.

The divide-by-16 output of binary divider 41*c* and the four outputs (divide-by-2, 4, 8 and 16) of binary divider 41*d* are connected to first inputs of NAND gates 42*a*, 42*b*, 42*c*, 42*d* and 42*e*, respectively. NAND gates 42*a–e* are positive logic devices. Thus, the output of a NAND gate switches to the low state only when both inputs are in the high state. The second inputs to NAND gates 42*a–e* are supplied from a positive polarity voltage biased circuit of five inverters 44*a–e* controlled by five-position mechanical BBDL "hold time" control switch 43. Switch 43 selects the particular one of the five inverters to have its input switched to ground through switch 43 and thereby have its output switched to the high state. The power supply voltage applied to the various components of our logic circuits is +5 volts in the $T^2L$ logic used throughout as one example of a specific embodiment of the logic circuitry, but also includes ±12 volts in the FIG. 6 circuit. The particular position of switch 43 thus determines which output of NAND gates 42*a–e* will be switched to the low stage in response to the positive polarity half period of the binary divider output associated therewith. In the particular position of switch 43 illustrated in FIG. 4, the divide-by-8 output of binary divider 41*d* is passed to NAND gate 45 through NAND gate 42*b*. Thus, the output of NAND gate 45 is a continuous square waveform signal H having a period of 12.8 milliseconds (ms) as indicated by the illustrated selected position of switch 43. The particular setting of switch 43 is determined by the application of our system. In an application for refreshing the video display on a subscriber's video monitor in a time-shared video communication system, and having three second intervals between new frames of video information as mentioned above, the logic circuitry and master clock frequency would be selected so that the square waveform signal H repetition rate would have a period of 16.7 milliseconds in order to obtain 180 recirculations for refreshing the video display monitor.

The output of NAND gate 45 is also applied to the "clear" inputs of binary counters 46*a* and 46*b* as well as to first inputs of NAND gate 47*a* and AND gate 47*b*. The (count-by-16) "carry" output of counter 46*a* is connected to the "enable" inputs of counter 46*b* and the (count-by-16) "carry" output thereof is connected to a first input of NAND gate 47*c*. The output of NAND gate 47*c* is connected to a second input of NAND gate 47*a* and to a second input of AND gate 47*b*. The output of NAND gate 47*a* is connected to the input of inverter 47*d* and to a second input of NAND gate 47*c*. The output of inverter 47*d* is connected to the "clock" inputs of counters 46*a* and 46*b*. The output of an inverter 47*f* which is connected to the "clock" input of dividers 41*a–d* is also connected through a second inverter 47*e* to a third input of NAND gate 47*a*. The output of inverter 47*d* provides the clock pulses to the BBDL on the clock line $C_p$, and the output of NAND gate 47*a* provides the complementary clock pulses $\overline{C}_p$. The output of AND gate 47*b* supplies a pulse synchronized with the beginning of each burst of clock pulses and may be used for test purposes. The circuit defined by gates 47*a–e* operates in the following manner:

When the output of NAND gate 45 goes from low to high, NAND gate 47*a* is enabled thereby allowing clock pulses of frequency $f_c$ to be fed to clock line $\overline{C}_p$ and, by means of inverter 47*d*, to clock line $C_p$. Since the output of NAND gate 50*b* is at a low state as the result of the output of NAND gate 45 having been low, "load" inputs of binary counters 46*a* and *b* are enabled thereby allowing the logic states of the flip-flops comprising these counters to be set to the logic states present at the outputs of inverters 49*a–h*. The outputs of inverters 49*a–h*, which are connected to the "data" inputs of counters 46*a* and *b*, are controlled by switch 48, in a manner similar to the operation of the "hold time" control circuit of switch 43 and inverters 44*a–e*, with the exception that switch 48 may have more than one closed position among its eight positions to thereby achieve a greater selection of the number of clock pulses per burst. NAND gates 50*a–d* comprise a conventional type D flip-flop whose purpose is to provide a time delay of $1/f_c$ before the high state of NAND gate 45 is applied to the "load" inputs of the aforesaid binary counters since such counters require a clock pulse while the "load" input is low in order to set the flip-flop in the desired manner that has been previously described.

During the second half of the first clock cycle, the output of NAND gate 50*b* is switched to a high state by means of the clock applied to first inputs of NAND gates 50*a* and 50*c* together with the output of NAND gate 45 applied to a second input of NAND gate 50*a* and such output, applied through inverter 50*e*, to second input of NAND gate 50*c*. The "load" inputs of binary counters 46*a* and *b* are inhibited in the high state so that the aforesaid counters begin to count the clock pulses that are passed to the clock lines.

The number of clock pulses allowed to pass to the clock lines is determined by the difference between the number that is initially stored in counters 46*a* and *b* by the "load" sequence just described, and the maximum count that the counters can attain, 256. For example, if a 248 pulse burst is desired, the decimal number 8 (256-248 = 8) is entered in binary form onto switches 48. During the first clock cycle of the burst, this binary number is entered into counters 46*a* and *b* as the initial state of the aforesaid counters and the counters begin counting from this number. 248 clock pulses may therefore occur before the aforesaid counters reach their maximum count of 256 at which time the "carry" output of counter 46*b* output goes high. During the portion of the clock cycle that inverter 47*c* is low, the output of NAND gate 47*a* will be high and this, combined with the high state of the "carry" output of counter 46*b* will force the output of NAND gate 47*c* low, thereby inhibiting NAND gate 47*a*, and terminating the clock burst.

The clock burst control logic is re-set in preparation for the next burst by the output of NAND gate 45 going to its low state which sets counters 46*a* and *b* to a binary equivalent of zero, causes the output of NAND gate 50*b* to go to zero, and inhibits NAND gate 47*a*. The output of NAND gate 47*c* goes to its high state as a result of re-setting binary counters 46*a* and 46*b*, and remains high until the next time that a "carry" output is received from counter 46*b*.

As stated hereinabove, the BBDL hold time control circuit which includes switch 43, inverters 44*a–e*, NAND gates 42*a–e* and 45 and the outputs of binary dividers 41*c*, 41*d* provides a programmable continuous square waveform signal H of fixed repetition rate which determines the fixed period of each "read-in" and subsequent "hold" (information storage period) cycle or "recirculation" and subsequent "hold" cycle. The second control circuit which includes mechanical switch 48, the plurality of positively biased inverters 49*a, b, c, d, e, f, g* and *h* and binary counters 46*a* and *b* provides a programmable number of clock pulses (at the master clock frequency) for each burst thereof to be applied to clock lines $C_p$ and $\overline{C}_p$ for clocking the BBDL(s) during each period of the H signal. The clock burst control switch 48 is generally not required, since the number of clock pulses per burst is established as one half the number of bucket-brigade stages in the BBDL, but such switch is illustrated for purposes of indicating a universal system with interchangeable BBDLs of different numbers of bucket-brigade stages.

Figures 7A, 7B, 7C, 7D, 7E, 7F:
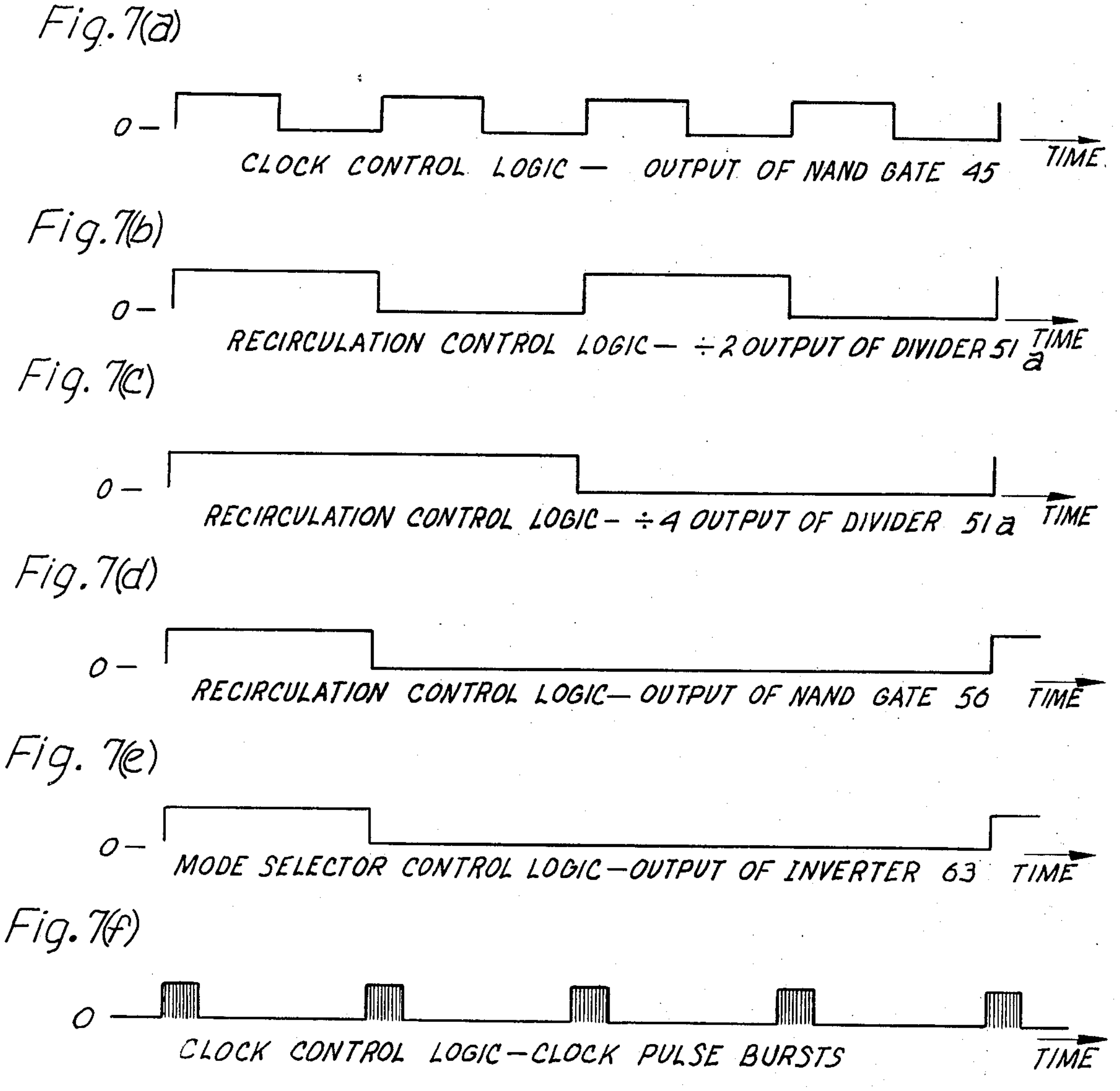
FIGS. 7*a, b, c, d, e, f* are voltage waveforms versus time appearing at various points in our memory system.

The bursts of clock pulses impressed on the clock lines $C_p$ and $\overline{C}_p$ in the FIG. 4 clock control logic circuit are of positive polarity voltage. The clock pulses are translated to negative polarity prior to being applied to the BBDL(s) by means of a conventional MOSFET gate driver circuit (not shown). As stated above, the relationship of bursts of clock pulses to the continuous square wave signal H at the output of NAND gate 45 which determines the period of each read-in or recirculation cycle including the hold period is illustrated in FIG. 7*f* referenced with respect to FIG. 7*a*.

Referring now to the recirculation control logic depicted in FIG. 5, the continuous square wave output H of NAND gate 45 in the clock control logic of FIG. 4 (having a repetition rate which determines the period of each complete read-in and subsequent hold time and each recirculation and subsequent hold time cycle) is supplied to the clock inputs of serially connected binary dividers 51*a* and 51*b*. The divide-by-16 output of divider 51*a* is connected to an enable input of binary divider 51*b*, a first input of AND gate 53*c* and to a first input of NAND gate 52*d*. The divide-by-2 output of binary divider 51*a* is connected to first inputs of NAND gate 52*a* and AND gate 53*a*. A second input to AND gate 53*a* is connected from the divide-by-4 output of binary divider 51*a*. The divide-by-8 output of divider 51*a* is connected to a first input of AND gate 53*a*. The output of AND gate 53*a* is connected to a second input of AND gate 53*b* and to a first input of NAND gate 52*b*. The output of NAND gate 53*b* is connected to a first input of NAND gate 52*c*. The divide-by-2 output of binary divider 51*b* is connected to a second input of AND gate 53*c*. The output of AND gate 53*c* as well as the divide-by-4 output of binary divider 51*b* are respectively connected to first and second inputs of AND gate 53*d*. The output of AND gate 53*d* is connected to a first input of NAND gate 52*e*. Finally, the divide-by-16 output of binary divider 51*b* is connected to a first input of NAND gate 52*f*. The second inputs to NAND gates 51*a–f* are supplied from a positive polarity biased circuit of six inverters 55*a–f* controlled by six-position mechanical "recirculations number" control switch 54. Switch 54 selects the particular one of the six inverters to have its input switched to ground through switch 54 and thereby have its output switched to the high state. The particular postion of switch 54 thus determines which output of NAND gates 52*a–f* will be switched to the low state in response to the positive polarity half period of the binary divider output associated therewith as in the case of the BBDL hold time control in the clock control logic. In the particular position of switch 54 illustrated in FIG. 5, the divide-by-2 and divide-by-4 outputs of binary divider 51*a* determine the signal to be passed through NAND gate 52*b* to NAND gate 56. The waveforms versus time of the voltage signals appearing at these divide-by-2 and four outputs of binary divider 51*a* are shown in FIG. 7(*b*) and (*c*) respectively. The outputs of NAND gates 52*a–f* are connected to inputs of NAND gate 56, and the output thereof is supplied to the mode selector control logic circuit illustrated in FIG. 6. The waveform output of NAND gate 56 for the illustrated position of switch 54 is shown in FIG. 7(*d*). It can be seen that the output of NAND gate 56 is in the high state only when both of the divide-by-2 and divide-by-4 outputs of binary divider 51*a* are in the high state, otherwise it is in the low state. Thus, as illustrated in FIG. 7(*d*), the output of NAND gate 56 remains in the high state for the first period of the BBDL hold time control waveform illustrated in FIG. 7(*a*) and switches to and remains in the low state for the following three periods during which time the information is recirculated and stored in the BBDL memory unit 10 three times. Thus, the numerals associated with the various switch positions of switch 54 indicate one plus the number of recirculations. The operation of switch 54 in the other positons as well as the functions of the other AND gates and NAND gate is similar to that described with reference to the illustrated second position of the switch and therefore need not be described herein. The output of NAND gate 56 is also applied to the display monitor 18 for controlling such monitor.

Referring now to FIG. 6, there is shown the mode selector control logic. The analog input signal $s(t)$ which is to be sampled and delayed by the BBDL memory unit 10 is applied to an input terminal 60 of our system. This terminal 60 is connected to the source electrode of a first MOSFET 11*a* in mode selector switch 11. A SYNC separator circuit 61 is also connected to the conductor supplying the analog input signal to mode selector switch 11 for removing the clock control logic synchronizing signal that is transmitted with the analog input signal. The output of NAND GATE 56 in the recirculation control logic 14 is applied to the gate electrodes of MOSFETs 11*a* and 11*b* in mode selector switch 11. The recirculation control logic signal is applied through a first inverter 62 and then such signal is passed through two parallel circuits one of which includes a second inverter 63 for inverting the signal with respect to the signal in the other branch circuit. Each branch circuit includes a diode 64*a*, a parallel R-C circuit 64*b*, and a bipolar transistor 64*c*. The function of each circuit comprising elements 64*a*, 64*b* and 64*c* is to shape the waveforms supplied by inverters 62 and 63 before they are applied to the base electrodes of transistors 64*c* so as to minimize the switching times of these transistors. The drain electrodes of MOSFETS 11*a* and 11*b* are interconnected to an input of an operational amplifier 65 which functions as a noninverting buffer amplifier that provides the required interface between the mode selector switch 11 and BBDL memory unit 10, and also acts as a signal driver for the BBDL circuit. The output of operational amplifier 65 is connected to the input of the driver circuit 20 in BBDL memory unit 10. The output of the BBDL memory unit 10 is connected to the source electrode of MOSFET 11*b* in the mode selector switch 11 through a fixed gain control consisting of potentiometer 66, field effect transistor 67 and operational amplifier 68 in the case when the gain selector switch 19 is in the fixed gain position. With gain selector switch 19 in the FIXED GAIN position, a bias voltage is supplied to the gate electrode of FET 67 from voltage source V. With gain selector switch 19 in the AGC position (automatic gain control), a negative feedback circuit is connected form the output of operational amplifier 68 to the input thereof through FET 67 which functions as a variable resistor and thereby controls the gain of amplifier 68 to prevent gain drifts in the BBDL memory unit with temperature. Obviously, in the case wherein the BBDL memory unit 10 includes two BBDLs connected in push-pull or differential relationship as illustrated in FIGS. 2*b*, 2*c* and 2*d*, the automatic gain control feature is generally not necessary. The automatic gain control circuit is conventional, and as one example, includes four serially connected bipolar transistors 69*a*, *b*, *c* and *d* and operational amplifier 69*e*. The gain can be automatically held by the AGC circuit and is determined by the setting of the potentiometer 69*f* in the emitter circuit of the first transistor 69*a*.

Mode selector switch 11 may be described as an analog gate switch and the gating signals applied thereto fro the recirculation control logic 14 determine the operation of such switch. Thus, the signal from the recirculation control logic 14 with switch 54 in a position for three recirculations has the waveform depicted in FIG. 7(*d*). This signal, upon inversion through inverter 62, is applied to the gate driver (transistor 64*c*) connected to the gate electrode of MOSFET 11*b* whereas the noninverted waveform signal of FIG. 7(*e*), due to a second inversion through inverter 63, is applied to the gate driver connected to the gate electrode of MOSFET 11*a*. As a result, during the high state of the waveform depicted in FIG. 7(*d*) and concurrently high state of the FIG. 7(*e*) waveform which occur during the first period of the BBDL hold control waveform depicted in FIG. 7(*a*), the mode selector switch transistor 11*a* conducts and thereby passes the analog input signal $s(t)$ to the input of the BBDL memory unit 10. At this time transistor 11*b* is in a nonconducting state and therefore the feedback circuit around the BBDL memory unit is open. As seen in FIG. 7(*f*), a burst of clock pulses of number selected by switch 48 in the clock control logic are applied to the BBDL memory unit 10 beginning with the positive going edge of the H signal to cause new information (analog input signal $s(t)$) to be read into the BBDL. During the remaining portion of the first period of the BBDL hold control waveform (FIG. 7(*a*)), the clock pulses are not applied to the clock lines $C_p$ and $\overline{C}_p$ and therefore the sampled analog information is stored within the BBDL memory unit 10. During the second, third and fourth periods of the hold control waveform, the high state of the inverted recirculation control logic signal at the output of inverter 62 causes MOSFET 11*b* to conduct and the low state of the signal at the output of inverter 63 in FIG. 7(*e*) causes MOSFET 11*a* to be in a nonconducting state. In this condition, the output of the BBDL memory unit 10 is connected to the input thereof and obtains the recirculation mode of operation in which the information signal is recirculated during the "on" time of the clock pulses and then remains stored in the BBDL during the "hold" period between the bursts of clock pulses.

As a result of the specific embodiment of the clock control logic and recirculation control logic described relative to FIGS. 4 and 5, it can be seen that each cycle of operation for read-in or recirculation can be selected to have one of five fixed periods between 1.6 and 25.8 milliseconds by means of BBDL hold time control switch 43, the number of clock pulses per burst can be controlled over a range from 2 to 256 by means of switch 48, and the number of recirculations can be selected in a range from 1 to 255 by means of switch 54. The BBDL hold time control switch 43 would be utilized where versatility in the periods between refreshing of the display monitor is required. The particular combination of hold time control selected by switch 43 and the number of recirculations selected by switch 54 would depend upon the particular application of our system.

The particular binary dividrs and counters described herein are of the model number 74161 manufactured by Texas Instruments, Inc. The decade dividers are model number 74160. All of the other logic gates are of compatible types.

From the foregoing it can be appreciated that the objectives set forth have been met in that a nondestructive read-out capability is achieved with our system since each recirculation is applied to the display monitor and such information can be kept stored within the BBDL until the next successive input information is applied. Although one specific embodiment of the clock control logic, recirculation control logic and mode selector control logic has been disclosed herein, it should be obvious that other logic circuits may also be utilized to obtain the same functions. Obviously, other numbers of recirculations can be obtained by using additional binary logic circuitry at the inputs to NAND 52 *a–f* gates. In like manner the BBDL hold time control can be varied. Finally, the driver amplifier stage (not shown) in the BBDL driver 20 can have its frequency response be complementary to that of the BBDL so that a constant bandwidth can be obtained for the analog memory system as a whole during the recirculation process. This frequency response can be achieved, for example, by connecting an R-C network around the driver amplifier in negative feedback relationship so that the amount of negative feedback is reduced at high frequencies thereby increasing the driver amplifier stage closed loop gain at the high frequencies of interest. It is therefore, to be understood that changes may be made in the particular embodiment of our invention as described which are within the full intended scope of our invention as defined by the following claims.

What we claim as new and desire to secure by Letters Patent of the United States is:

1. An analog bucket-brigade memory system having nondestructive read-out capability comprising
bucket-brigade delay line means for storing an analog information signal supplied to the memory system,
first switch means for selectively connecting the bucket-brigade delay line means in a read-in mode in a first state of said first switch means, and in a recirculate mode in a second state thereof, output of said first switch means connected to an input of said bucket-brigade delay line means,
an input terminal connected to a first input of said first switch means which obtains the read-in mode state thereof, said input terminal adapted to be supplied with the analog information signal,
gain block means for providing a feedback network around said bucket-brigade delay line means only in the recirculate mode of operation of the memory system, said gain block means having an input connected to an output of said bucket-brigade delay line means and having an output connected to a second input of said first switch means which obtains the recirculate mode state thereof, and
control logic means connected to said first switch means for controlling the state of said first switch means to thereby selectively operate the memory system in the read-in mode or in the recirculate mode, said control logic means also connected to said bucket-brigade delay line means for supplying a burst of clock pulses thereto for a first portion of each read-in and recirculate cycle, the analog information being stored in said bucket-brigade delay line means for a second portion of each read-in and recirculate cycle in the absence of clock pulses from said control logic means, the storage and recirculation of the analog information permitting a nondestructive read-out capability for the memory system.

2. The analog bucket-brigade memory system set forth in claim 1 and further comprising
a display monitor having an input connected to the output of said bucket-brigade delay line means for displaying the analog information read into and stored therein, said display monitor being refreshed with each recirculation of the stored analog information, said control logic means also connected to said display monitor for synchronization of the operation thereof with the operation of said bucket-brigade delay line means.

3. The analog bucket-brigade memory system set forth in claim 1 wherein
said bucket-brigade delay line means comprises
a balanced driver stage having an input connected to the output of said first switch means,
a first bucket-brigade delay line for sampling and delaying the analog information signal,
a second bucket-brigade delay line having the same number of bucket-brigade stages as said first delay line for sampling and delaying by an equal time the analog information signal, outputs of said driver stage connected to inputs of said first and second delay lines, said second delay line connected in parallel with said first delay line, the bucket-brigade stages of said second delay line clocked in parallel with corresponding stages of said first delay line but clocked 180° out-of-phase therewith to obtain a push-pull mode of operation of said first and second delay lines, and
a summer having input connected to outputs of said first and second delay lines, the push-pull mode of operation of said first and second delay lines resulting in cancellation at the summer output of clock frequency components occurring in the signals at the outputs of said first and second delay lines.

4. The analog bucket-brigade memory system set forth in claim 1 wherein
said gain block means is a fixed gain component.

5. The analog bucket-brigade memory system set forth in claim 1 wherein
said gain block means is a controllable gain component providing automatic gain control to prevent gain drifts in said bucket-brigade delay line means with varying temperature.

6. The analog bucket-brigade memory system set forth in claim 1 wherein said first switch means is of the electronic type.

7. The analog bucket-brigade memory system set forth in claim 1 and further comprising a sync separator circuit connected to said input terminal for removing a clock control logic synchronizing signal transmitted with the analog information signal, output of said sync separator circuit connected to an input of said control logic means for synchronizing the operation thereof with the analog signal.

8. The analog bucket-brigade memory system set forth in claim 1 and further comprising low pass filter means connected to an output of said bucket-brigade delay line means for removing undesired high frequency components from the sampled analog signal at the output of said bucket-brigade delay line means.

9. The analog bucket-brigade memory system set forth in claim 1 wherein said bucket-brigade delay line means comprises a driver stage having an input connected to the output of said first switch means, and a first bucket-brigade delay line for sampling and delaying the analog information signal, output of said driver stage connected to an input of said first bucket-brigade delay line.

10. The analog bucket-brigade memory system set forth in claim 9 wherein said bucket-brigade delay line means further comprises means connected to an output of said first bucket-brigade delay line for restoring the average value of the analog component in the signal at the output of said first bucket-brigade delay line to its original level at the input thereof.

11. The analog bucket-brigade memory system set forth in claim 1 wherein said bucket-brigade delay line means comprises a differential driver stage having an input connected to the output of said first switch means, a first bucket-brigade delay line for sampling and delaying the analog information signal, a second bucket-brigade delay line having the same number of bucket-brigade stages as said first delay line for sampling and delaying by an equal time the analog information signal, inverted and noninverted outputs of said driver stage connected respectively to inputs of said first and second delay lines, said second delay line connected in parallel with said first delay line, the bucket-brigade stages of said second delay line clocked in parallel with corresponding stages of said first delay line and in-phase therewith to obtain a differential mode of operation of said first and second delay lines, and a summer having inputs connected to outputs of said first and second delay lines, the differential mode of operation of said first and second delay lines resulting in cancellation at the summer output of clock frequency components and undesired DC components occurring in the signals at the outputs of said first and second delay lines.

12. The analog bucket-brigade memory system set forth in claim 11 wherein said driver stage is a balanced differential driver stage, and said summer is a differential summer.

13. The analog bucket-brigade memory system set forth in claim 12 wherein said bucket-brigade delay line means further comprises a third bucket-brigade delay line having the same number of bucket-brigade stages as said fist delay line and connected in push-pull relationship therewith, a fourth bucket-brigade delay line having the same number of bucket-brigade stages as said first delay line and connected in push-pull relationship with said second delay line, outputs of said driver stage further connected to inputs of said third and fourth delay lines, outputs of said third and fourth delay lines connected to inputs of said summer, the push-pull mode of operation of said first and third delay lines, and of said second and fourth delay lines resulting in a smoothed waveform at the summer output having cancellation of clock frequency components and undesired DC components occurring in the signals at the outputs of said first, second, third and fourth delay lines.

14. The analog bucket-brigade memory system set forth in claim 1 wherein said control logic means comprises a clock control logic circuit for determining the period for each cycle of read-in and memory storage and each cycle of recirculate and storage, said clock control logic also determining the number of clock pulses per burst, a recirculation control logic circuit connected to an output of said clock control logic circuit for determining the number of recirculations between successive read-ins of the analog information, and a mode selector control logic circuit connected to said input terminal and to an output of said recirculation control logic circuit, the mode selector control logic including said first switch means for determining the order in which said bucket-brigade delay line means operates in the read-in or recirculate mode.

15. The analog bucket-brigade memory system set forth in claim 14 wherein said clock control logic circuit includes a second switch means for selectively determining the period for each cycle of read-in and memory storage and for each cycle of recirculate and memory storage.

16. The analog bucket-brigade memory system set forth in claim 14 wherein said clock control logic circuit includes a second switch means for selectively determining the number of clock pulses per burst.

17. The analog bucket-brigade memory system set forth in claim 14 wherein said recirculation control logic circuit includes a second switch means for seelctively determining the number of recirculations between successive read-ins of the analog information signal.

18. The analog bucket-brigade memory system set forth in claim 14 and further comprising a sync separator circuit connected to said input terminal for removing a clock control logic synchronizing signal transmitted with the analog information signal, output of said sync separator circuit connected to an input of said clock control logic circuit for synchronizing the operation thereof with the start of the analog signal.

19. An analog bucket-brigade memory system having non-destructive read-out capability comprising a first bucket-brigade delay line for sampling and delaying an analog input information signal, a first electronic switch for selectively operating said memory system in a read-in and store mode or in a recirculate and store mode, said first electronic switch having a first input connected to the input terminal of said memory system to which is applied the analog input information signal, a driver stage having an input connected to an output of said first electronic switch, said driver stage having an output connected to an input of said first bucket-brigade delay line, a clock control logic circuit including a clock pulse generator for supplying bursts of two-phase clock voltage pulses to bucket-brigade stages of said first bucket-brigade delay line to cause propagation of the sampled analog input signal through said first bucket-brigade delay line, said clock control logic determining the period of each read-in and store cycle and each recirculate and store cycle, means connected to an output of said first bucket-brigade delay line for restoring the average value of the analog component of the sampled signal at the output of said first bucket-brigade delay line to its original value at the input thereof, a low pass filter having an input connected to an output of said analog component average value restoring means for removing undesired high frequency components from the samples analog signal occurring at outputs of said first bucket-brigade delay line and said analog component average value restoring means, a feedback network having an input connected to the output of said analog component average value restoring means and an output connected to a second input of said first electronic switch, said feedback network including a gain block for determining the gain of the feedback network, a recirculation control logic circuit having an input connected to an output of said clock control logic for determining the number of recirculations betwen successive read-ins of the analog input information signal, a mode selector control logic circuit having an input connected to an output of said recirculation control logic and an output connected to said first electronic switch for controlling the operation thereof so that in the read-in mode of system operation said first electronic switch has the output thereof connected to the first input thereof and in the recirculate mode has the output connected to the second input, said clock control logic circuit supplying the bursts of clock pulses during first portions of each period of the read-in and store cycle and of each recirculate and store cycle, the analog information being stored in sai bucket-brigade delay line for a second portion of each cycle during which there is an absence of clcok pulses being supplied to the bucket-brigades of said first bucket-brigade delay line, and a display monitor having an input connected to an output of said low pass filter for displaying the analog information read into and stored within said bucket-brigade delay line, said display monitor being refreshed with each recirculation of the stored analog information, said recirculation control logic having an output connected to said display monitor for synchronization of the operation thereof with the operation of said first bucket-brigade delay line, the storage and recirculation of the analog information in said bucket-brigade delay line permitting non-destructive read-out capability for the memory system.

20. The analog bucket-brigade memory system set forth in claim 19 and further comprising a second bucket-brigade delay line having the same number of bucket-brigade stages as said first delay line for sampling and delaying by an equal time the analog input information signal, the bucket-brigade stages of said second delay line being clocked from said clock control logic in parallel with corresponding stages of said first delay line but 180° out-of-phase relationship therewith to obtain a push-pull mode of operation of said first and second delay lines, said driver stage being a balanced driver having a gain balance control and a bias balance control for compensating for differences in gain and DC level characteristics between said first and second bucket-brigade delay lines, said analog component average value restoring means having an input connected to an output of said second bucket-brigade delay line, and an algebraic summer having inputs directly connected to outputs of said analog component average value restoring means, output of said summer directly connected to the input of said low pass filter.

21. The analog bucket-brigade memory system set forth in claim 19 and further comprising a second bucket-brigade delay line having the same number of bucket-brigade stages as said first delay line for sampling and delaying by an equal time the analog input information signal, the bucket-brigade stages of said second delay line being clocked from said clock control logic in parallel with corresponding stages of said first delay line and in-phase relationship therewith to obtain a differential mode of operation of said first and second delay lines, said driver stage being a balanced differential driver having a gain balance control and a bias balance control for compensating for differences in gain and DC level characteristics between said first and second bucket-brigade delay lines, said driver stage including an inverter for inverting the signal to the input of one of said first and second delay lines, a differential summer having inputs connected to outputs of said first and second delay lines, output of said summer directly connected to the input of said low pass filter, the differential mode of operation of said first and second delay lines resulting in cancellation of undesired DC components occurring in the signals at the outputs of said first and second delay lines so that said analog component average value restoring means is not required in said memory system.

* * * * *